United States Patent [19]
Wharton et al.

[11] Patent Number: 5,831,664
[45] Date of Patent: Nov. 3, 1998

[54] METHOD AND SYSTEM FOR SYNCHRONIZING DATA BETWEEN AT LEAST ONE MOBILE INTERFACE DEVICE AND AN INTERACTIVE TERMINAL

[75] Inventors: Cathleen S. Wharton, Louisville; Scott P. Robertson, Lafayette; Catherine A. Ashworth, Boulder; Marita Franzke, Denver, all of Colo.

[73] Assignees: MediaOne Group, Inc., Englewood; U S West, Inc., Denver, both of Colo.

[21] Appl. No.: 572,790

[22] Filed: Dec. 15, 1995

[51] Int. Cl.⁶ .............................. H04N 7/10; H04N 7/14
[52] U.S. Cl. .................... 348/13; 348/10; 348/8; 455/6.2; 455/4.2; 345/1; 345/2; 345/156
[58] Field of Search .................. 348/10, 11, 12, 348/13, 7, 6, 8; 455/6.2, 6.3, 4.2, 5.1; 345/1, 2, 3, 156, 158, 173, 179; H04N 7/10, 7/14

[56] References Cited

U.S. PATENT DOCUMENTS

| | | | |
|---|---|---|---|
| 5,285,278 | 2/1994 | Holman | 348/12 |
| 5,307,055 | 4/1994 | Baskin et al. | 345/1 |
| 5,519,433 | 5/1996 | Lappington et al. | 348/10 |
| 5,526,023 | 6/1996 | Sugimoto et al. | 345/173 |
| 5,574,964 | 11/1996 | Hamlin | 348/13 |
| 5,675,362 | 10/1997 | Clough et al. | 345/2 |

*Primary Examiner*—John K. Peng
*Assistant Examiner*—Linus H. Lo
*Attorney, Agent, or Firm*—Brooks & Kushman, P.C.

[57] ABSTRACT

A method and system for synchronizing display of data relating to a predetermined application between an interactive terminal and at least one mobile interface device having a display. The at least one mobile interface device receives a user input signal and transmits the user input signal for synchronization with the interactive terminal. A set-top transceiver device is operatively coupled to the interactive terminal and receives the user input signal from the at least one mobile interface device. The set-top transceiver device also transmits a synchronization signal to the at least one mobile interface device and the interactive terminal. A central processing unit having a database is operatively coupled to the set-top transceiver device for receiving and processing the user input signal based on the database to obtain the synchronization signal for receipt by the set-top transceiver device. The synchronization signal includes a first display control signal for controlling the display of the at least one mobile interface device and a second display control signal for controlling the display of the interactive terminal.

45 Claims, 10 Drawing Sheets

METHOD AND SYSTEM FOR SYNCHRONIZING DATA BETWEEN AT LEAST ONE MOBILE INTERFACE DEVICE AND AN INTERACTIVE TERMINAL

TECHNICAL FIELD

This invention relates to a method and system for synchronizing the display of data between at least one mobile interface device having a display and an interactive terminal having a display.

BACKGROUND ART

Remote control devices which control television receivers have been available to consumers for many years. These devices typically operate by generating an infra-red remote control beam modulated with commands for either raising or lowering the volume of a television receiver, changing channels, power up, power down, and for operating other more common controls on a television receiver. These remote control devices typically have fixed buttons that influence selection of items identified on the television screen and contain no information about the state of the television offering. Furthermore, these remote control devices only send information in one direction to the television receiver.

The functionality of remote control devices has changed with the introduction of interactive terminals, such as television receivers, and computer terminals. An interactive terminal allows a user to change a control graphic display based on an input signal from the user. Remote control devices currently available for interactive television (ITV) are similar to traditional television remotes in three ways: button presses for input, unidirectional communication, and limited information display. The entire television presentation is controlled through the pressing of buttons. In a typical ITV service, a menu of options is displayed on the television from which one option is selected by pressing the number key or arrow button on the remote control device. Furthermore, a typical remote control device sends an infra-red signal to the television or set-top box, but the remote control device does not receive input from the same devices. Consequently, there is no need for an information display on the remote. Remote control devices also display a meager amount of information in the form of textually labeled buttons.

Because of the characteristics of existing remote control devices, developers of interactive television applications must make the applications consistent with existing remote control devices. The general usability of interactive television offerings is also limited, for example, by requiring labeling of screen objects with numbers that will correspond to the channel keys on remote control devices.

The need exists, therefore, for a remote control interface that can be dynamically reconfigured to correspond with an application. A need also exists for an interactive system that allows a wide range of interfaces to be presented to the user.

SUMMARY OF THE INVENTION

It is an object of the present invention to provide a method and system for synchronizing display of data relating to a pre-determined application between an interactive terminal and a mobile interface device having a display.

It is another object of the present invention to provide a mobile interface device having a reconfigurable display to correspond with data displayed on the interactive terminal.

It is a further object of the present invention to provide a mobile interface device which augments the data displayed on the interactive terminal.

Still further, it is an object of the present invention to provide a mobile interface that accepts both continuous and discrete interactions and movements for synchronization with an interactive terminal.

It is yet another object of the present invention to provide a method and system that allows multiple mobile interface devices to interact with an interactive terminal.

In carrying out the above objects and other objects, features and advantages of the present invention, a method is provided for synchronizing display of data relating to a predetermined application between the interactive terminal and at least one mobile interface device having a display. The method includes the step of providing each of the at least one mobile interface device with a user input receiving means for receiving a user input signal and for transmitting the user input signal for synchronization with the interactive terminal. The method also includes the step of providing a set-top transceiver device operatively coupled to the interactive terminal for receiving the user input signal from the at least one mobile interface device and for transmitting a synchronization signal to the at least one mobile interface device and the interactive terminal. Still further, the method includes the step of providing a central processing unit having a data base and operatively coupled to the set-top transceiver device for receiving and processing the user input signal based on the database to obtain the synchronization signal for receipt by the set-top transceiver device. The synchronization signal includes a first display control signal and a second display control signal, the first display control signal for controlling the display of the at least one mobile interface device and the second display control signal for controlling the display of the interactive terminal.

In further carrying out the above objects and other objects, features and advantages, of the present invention, a system is also provided for carrying out the steps of the above-described method. The system includes at least one mobile interface device having a display and a user input receiving means for receiving a user input signal and for transmitting the user input signal for synchronization with the interactive terminal. The system also includes a set-top transceiver device operatively coupled to the interactive terminal for receiving the user input signal from the at least one mobile interface device, and for transmitting a synchronization signal to the at least one mobile interface device and the interactive terminal. The system further includes a central processing unit having a database and operatively coupled to the set-top transceiver device for receiving and processing the user input signal based on the database to obtain the synchronization signal for receipt by the set-top transceiver device.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIGS. 3a–3f are schematic diagrams illustrating the various display screens available for the mobile interface device in a real estate application;

BEST MODES FOR CARRYING OUT THE INVENTION

Figure 1:
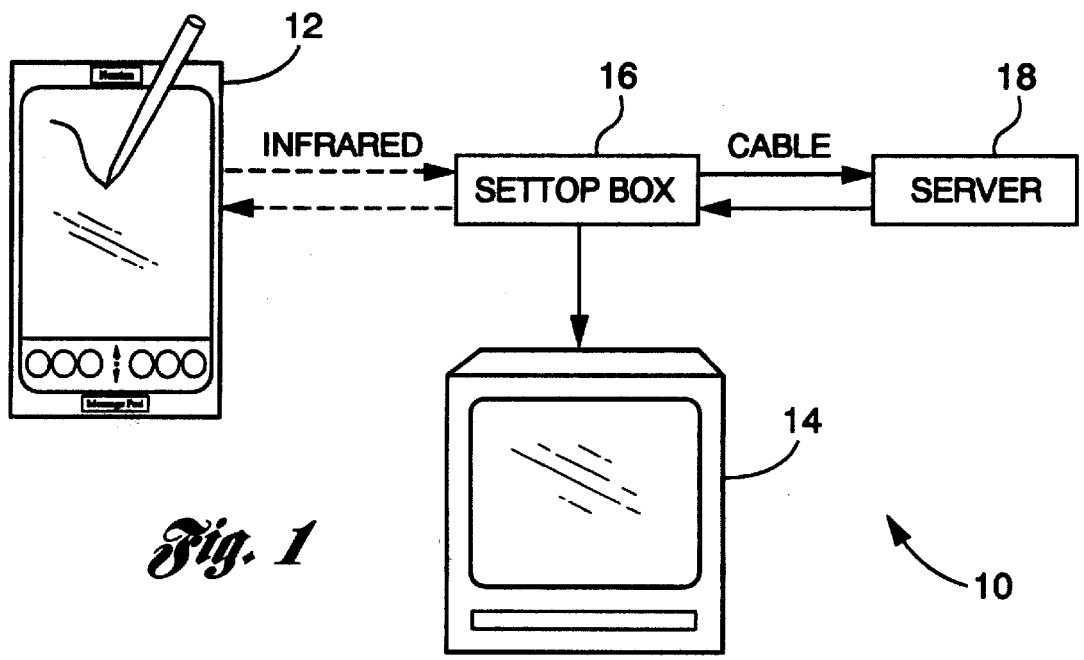
FIG. 1 is a schematic block diagram of the system of the present invention.

Turning now to FIG. 1, there is shown a schematic block diagram of the system of the present invention, denoted generally by reference numeral 10. The system 10 includes at least one mobile interface device 12, such as an Apple Newton™ personal digital assistant (PDA) for transmitting user input signals. The mobile interface device 12 is a hand-held, mobile computing device that has built-in infra-red and serial communications capabilities and is designed to interact with other devices. The system 10 further includes an interactive terminal 14, such as a television receiver. The interactive terminal 14 may also be a computer terminal or any other similar device. The mobile interface device 12 communicates with the interactive terminal 14 through a set-top transceiver device 16. Communication between the mobile interface device 12 and the set-top transceiver device 16 may be either wireless infra-red technology or wireline communications. The system 10 further includes a central processing unit 18, such as a data server, for communicating with the set-top transceiver device 16. Communication between the set-top transceiver device 16 and the server 18 may be accomplished through either a wireless or wireline bi-directional communication. Bi-directional communication enables complex user-system interactions. For example, a user can perform an action on the mobile interface device 12 which is received by the set-top transceiver device 16, which then downloads data from the server 18 and which can then be displayed on the interactive terminal 14 and/or transmitted back to the mobile interface device 12.

A user interacts with the mobile interface device 12 in one of many ways. The user may interact with the mobile interface device 12 using a key pad, a touch screen, voice input, or in any other available manner. In the touch screen embodiment, the user interacts with the mobile interface device 12 by touching control buttons or icons, or by continuously tracing a path. Interaction with the touch screen can be accomplished using either a stylus or the user's fingers.

The set-top transceiver device 16 includes a processor and data storage capability. The set-top transceiver device 16 processes signals received by the mobile interface device 12 and transmits a corresponding signal to the server 18. The set-top transceiver device 16 then receives signals from the server 18 and broadcasts a first display signal to the mobile interface device 12 and transmits a second display signal to the interactive terminal 14. Thus, the set-top transceiver device 16 is a two-way communication processor.

The server 18 receives data from the set-top transceiver device 16. The data includes identification of all the devices 12, 14 that are interacting, what application is being used, and what action has taken place. The server 18 sends data to the set-top transceiver device 16, including target devices and information specific to each target device. The set-top transceiver device 16 then sends video information directly to the interactive terminal 14 and broadcasts information to the mobile interface device 12.

Figure 2:
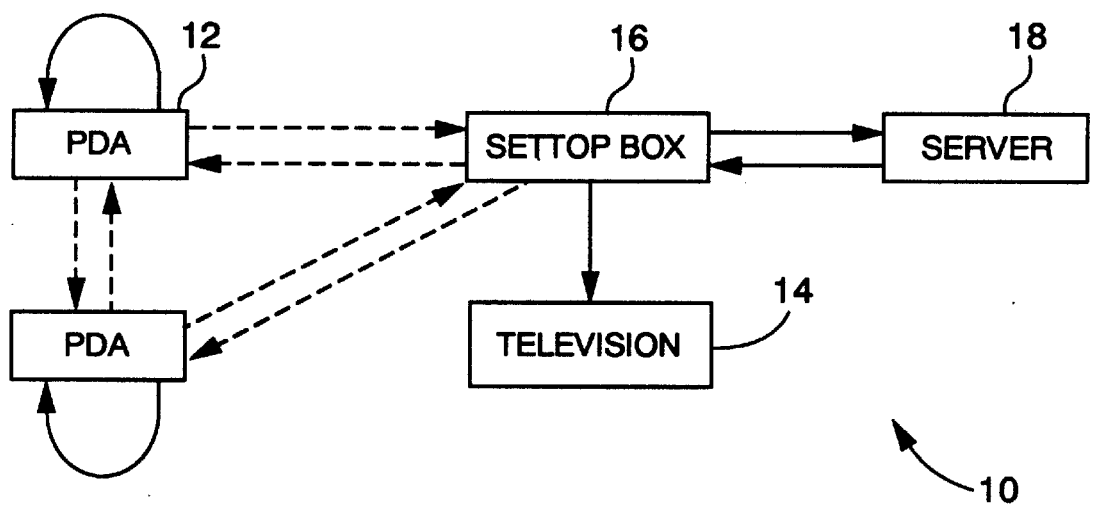
FIG. 2 is a block diagram of a second embodiment of the system of the present invention.

The system of the present invention can be expanded to support multiple devices, as shown in FIG. 2. When multiple mobile interface devices 12 are involved, an action on one mobile interface device 12 is broadcast to all others. Each mobile interface device 12 takes its appropriate action and broadcasts the result. Thus, the mobile interface devices 12 remain coordinated, and each has information on what other mobile interface devices 12 are in the application environment. In the case of a mobile interface device 12, such as a PDA, the PDA can be used by itself as a stand-alone unit. In this case, a broadcast is not replied to, so the application knows that it is being used on a stand-alone basis and can operate accordingly.

REAL ESTATE APPLICATION

The system of the present invention will be described in conjunction with a real estate application using a PDA and a television (TV). It should be understood, however, that the example described is for illustrative purposes only. The invention has many applications, including, but not limited to real estate.

The domain of a real estate application is information-rich, requires considerable data base browsing, involves comparison of multiple selection criteria, and benefits greatly from multi-media presentation format. It is a domain which traditionally requires the intervention of a human agent to mediate search and help in decision making. It also requires home buyers to be present in the new location and to spend considerable time traveling to homes and neighborhoods for a first-time look. A service that reduces any of these requirements is highly valuable.

Figure 3B:
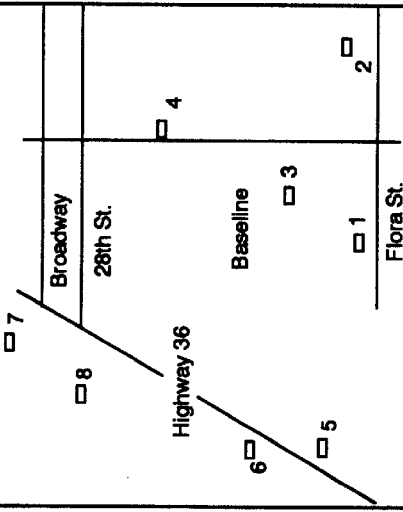
Figure 3A:
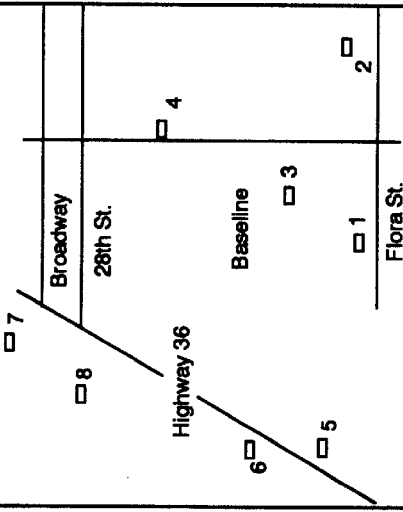
Figure 3B:
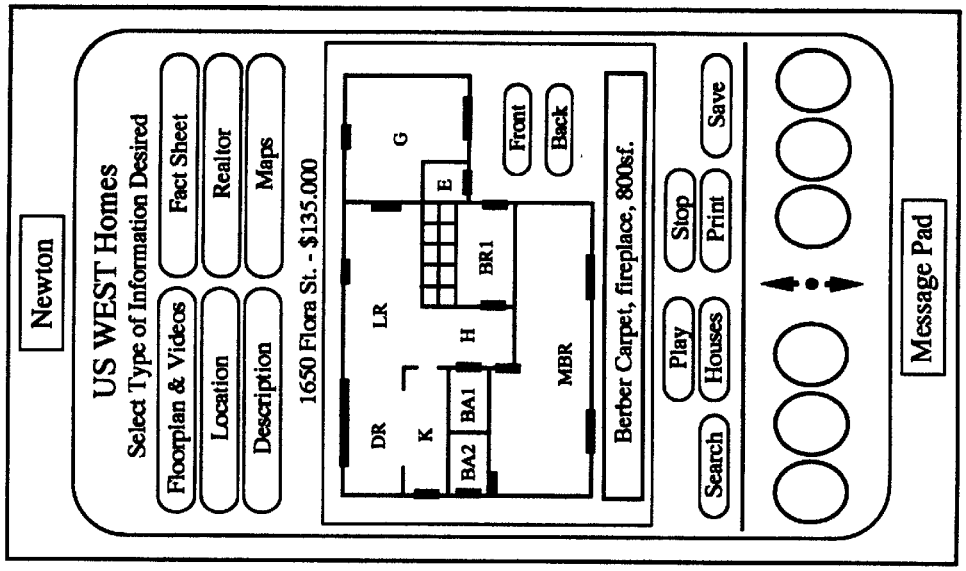
Figure 3C:
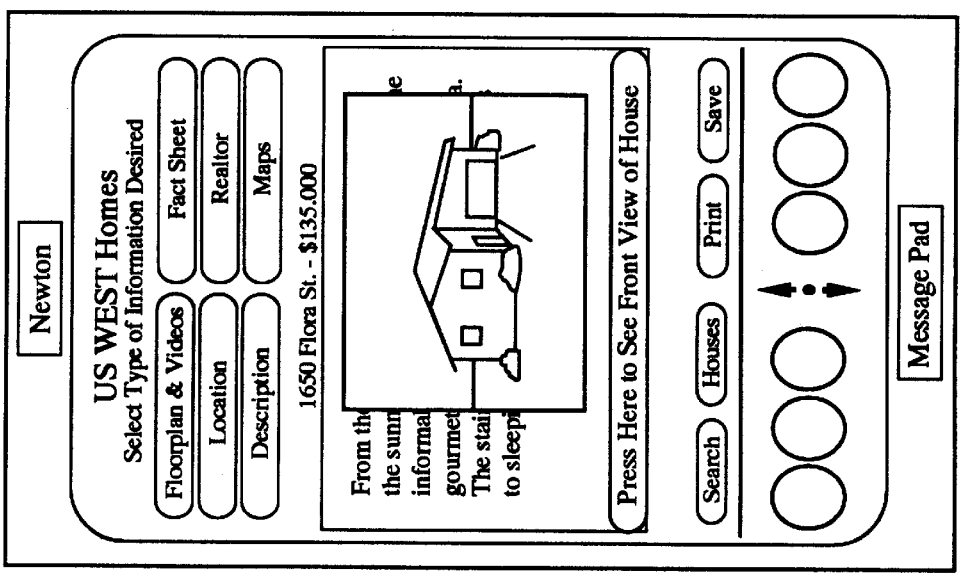

Turning now to FIGS. 3a–3f, there is shown the various possible screen displays available to the PDA 12 in the real estate application. FIG. 3a illustrates the House Selection Screen which includes the results of an initial search of a set of candidate homes. The homes are presented in the form of a map on the PDA 12 and a mosaic of pictures are displayed on the TV 14. The map includes the major roads for the area and the locations of the homes. This combination display is useful for the "catalog shopping" phase when a home buyer wants to see what the homes look like. Without the TV 14, the PDA 12 is still useful as a map which can be used to drive to different house locations. From the House Selection Screen, the user may return to an earlier search phase by pressing the "SEARCH" button at the bottom of the screen. If the user wishes to see details about a home, he or she taps on the appropriate home number on the map of the PDA 12.

FIG. 3b illustrates the House Information Screen which contains a text description of the selected home from the House Selection Screen. If a TV 14 is used, the TV 14 displays a large view of the home. A low-resolution view of the home can also be presented on the House Information Screen. The image on the PDA 12, which appears as an overlay of the text, is useful if a TV 14 is not available. The "HOUSES" button shown in FIG. 3b will return the user to the House Selection Screen. The "SEARCH" button remains available to initiate a new search. "PRINT" and "SAVE" buttons are available at the bottom of the screen to create more permanent records of the information about the home being inspected. The House Information Screen contains six home information buttons at the top and an information box in the center. The six information buttons provide access to various categories of information about the selected home. This information appears in the information box and may have accompanying information on the screen of the TV 14.

When a user presses the "LOCATION" button on the House Information Screen, plain text describing the location is displayed in the information window. A picture of the street is shown on the TV 14, if available A "PLAY" button on the PDA 12 allows a user to see a "walking tour" of the street.

When the "DESCRIPTION" button is selected, plain text describing the home is displayed in the information window. This description corresponds to the "ADVERTISING" description that typically appears in printed catalogs or newspapers. A front view of the home is shown on the TV 14.

When a user selects the "FACT SHEET" button, plain text with technical details about the home is displayed in the information window. This text contains specifics like the number of bedrooms, square footage, date of construction, type of heating, etc., that would appear on a typical detailed spec sheet from a commercial listing service. A picture of the home may also be shown on the TV 14.

When a user selects the "REALTOR" button, plain text giving background information about the realtor is displayed in the information window. The realtor's picture appears on the television. A "PLAY" button on the PDA 12 results in the display of a video of the realtor describing him or herself and the home. A button on the PDA 12 can be selected to show a low resolution picture of the realtor on the PDA 12 in case a TV 14 is not available.

Upon selecting the "FLOOR PLANS AND VIDEOS" button, a floor plan of the currently selected home appears in the information window, as shown in FIG. 3d. When a room is selected, as with a stylus, information about the room (e.g., square footage, flooring type, etc.) appears in a text window on the PDA 12. In addition, if the user is using a TV 14, selecting a room causes an image of the room to be displayed on the TV 14. "PLAY" and "STOP" video control buttons appear on the screen of the PDA 12 when a floor plan is being studied. When the "PLAY" button is selected, a video showing the entire room is presented on the interactive terminal 14. Thus, the user can use the PDA 12 to control a video walk-through of the home. "BACK" and "FRONT" buttons are also shown on the PDA 12 and pressing one of these yields either a front or back view of the home on the TV 14.

If a TV 14 is not available, the floor plan presentation on the PDA 12 is still useful as a stand alone application. Users can navigate through a home and learn details about each room by taking the PDA 12 with them on a real walk-through, for example.

Figure 3F:
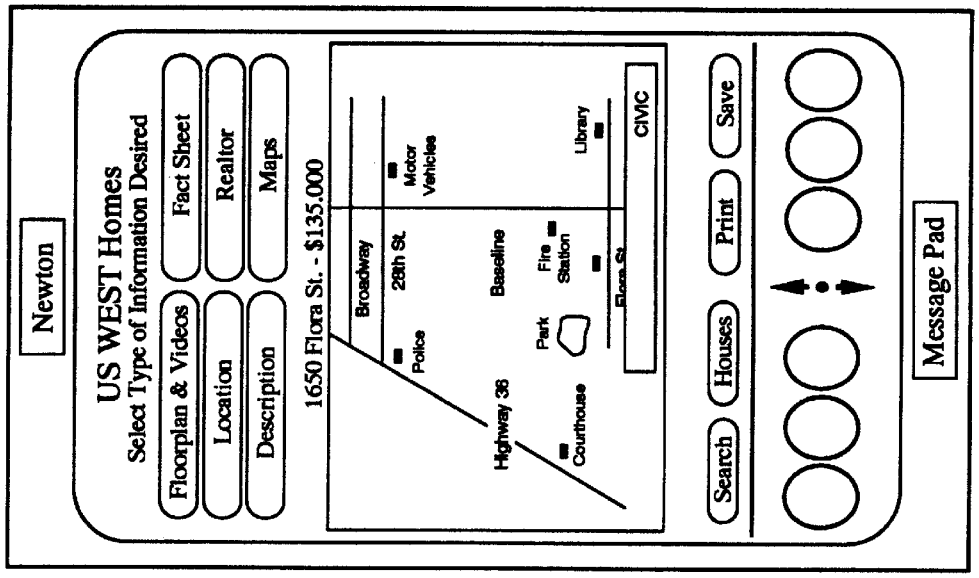
Figure 3E:
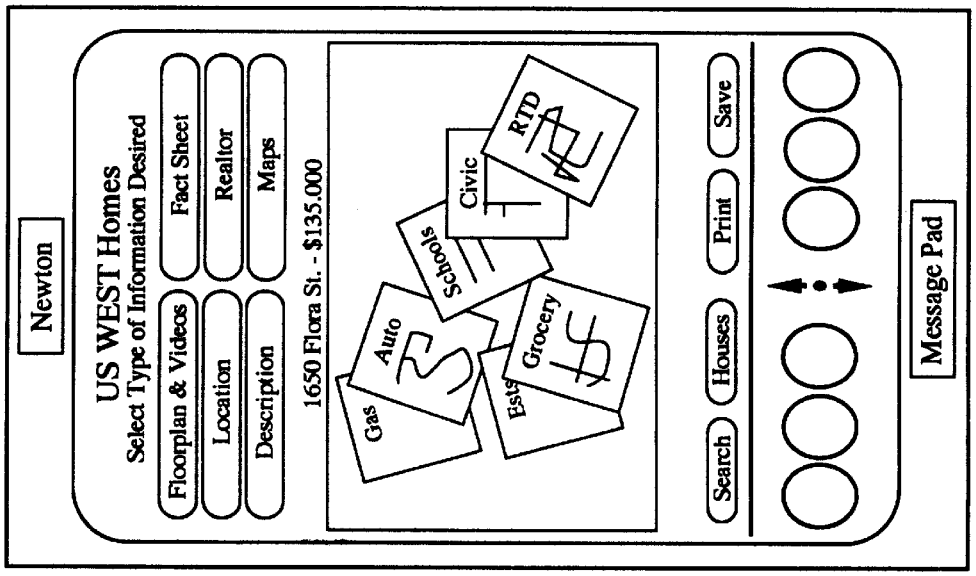

When a user selects the "MAPS" button on the House Information Screen, several map icons are displayed in the information window of the PDA 12, as shown in FIG. 3e. The virtual buttons are labeled with different types of maps, for example "RTD" (the local bus system), "SCHOOLS", "CIVIC", etc. The TV 14 displays a detailed map of the region. When a user selects one of the map types on the PDA 12, the PDA 12 information screen shows a very general schematic of the appropriate map with important locations identified. The more detailed map on the TV 14 displays a highlight of the selected map component. For example, when "CIVIC" is selected, a map of main roads is shown on the PDA 12, as shown in FIG. 3f, with locations like the library and police station indicated. These landmarks are also highlighted on the detailed map displayed on the TV 14. When an item like a landmark or bus stop is selected on the PDA 12, an address appears on the PDA 12 and a narration, if available, appears on the TV 14. To see another map, the user need only to re-select the "MAPS" button. Without a TV 14, the maps can be used to navigate to different locations or to simply learn about the neighborhood. With a TV 14, the user gains a visual feel for the neighborhood and can gather considerable information about each of the establishments.

Figure 4:
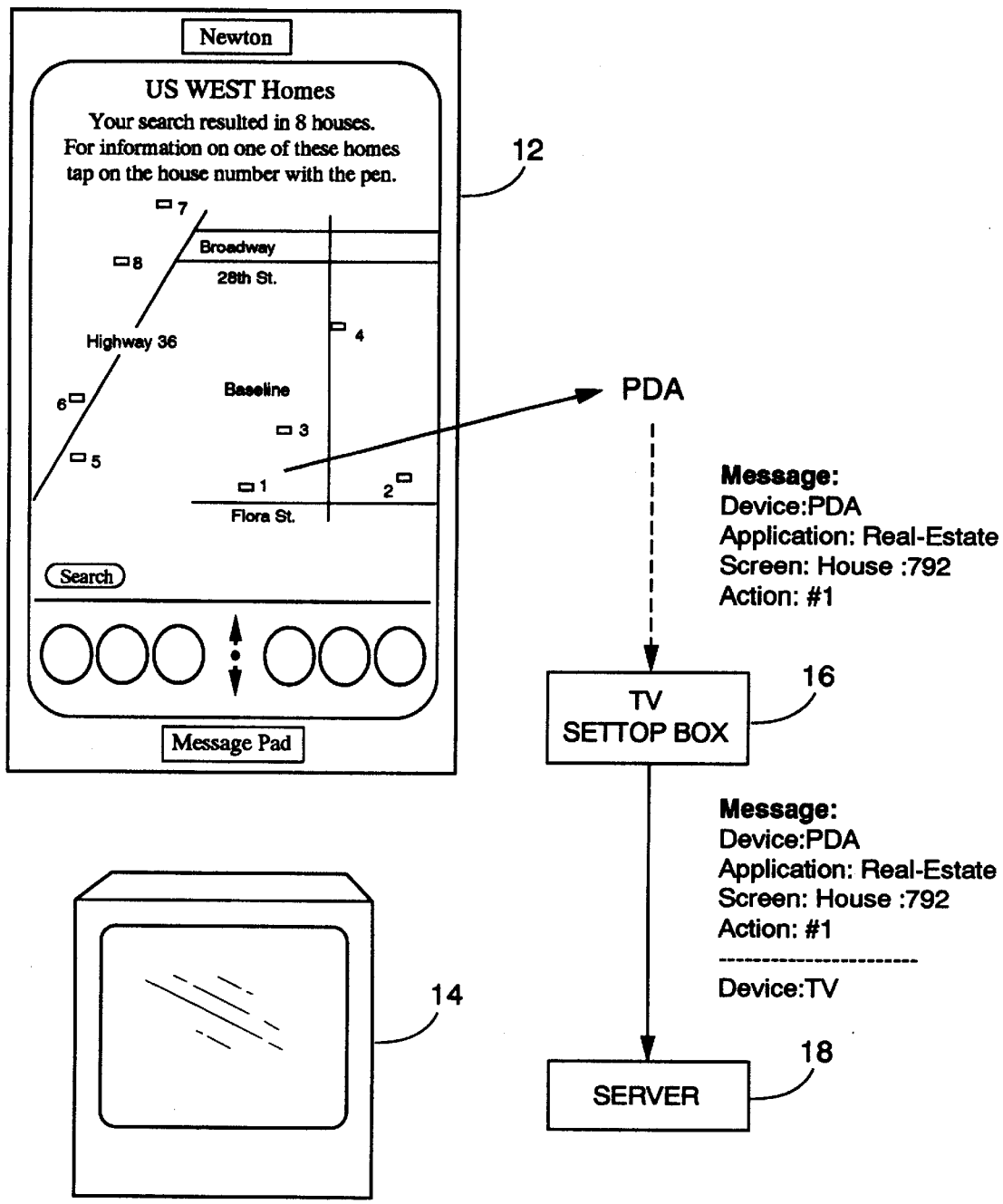
FIG. 4 is a schematic diagram illustrating the sequence of steps performed by the system of the present invention when the mobile interface device receives a user input signal.

Consider the example in which the PDA 12 displays a plurality of home locations based on a user search criteria, as shown in FIG. 4. When the user selects the tome labeled "1" on the PDA 12, the PDA 12 sends a signal to the set-top transceiver device 16. The signal contains information about the device, application, data, and user action. In this example, the device is a PDA, the application is real estate, the data corresponds to the current screen display, which is House:792, and the user action is the selection of number "1". The set-top transceiver device 16 adds information about the other device (i.e., the TV 14) and sends this signal to the server 18. If the PDA had the data on each home, the PDA 12 could run its internal application to update the screen, otherwise, the PDA 12 will wait for a download from the set-top transceiver device 16.

Figure 5:
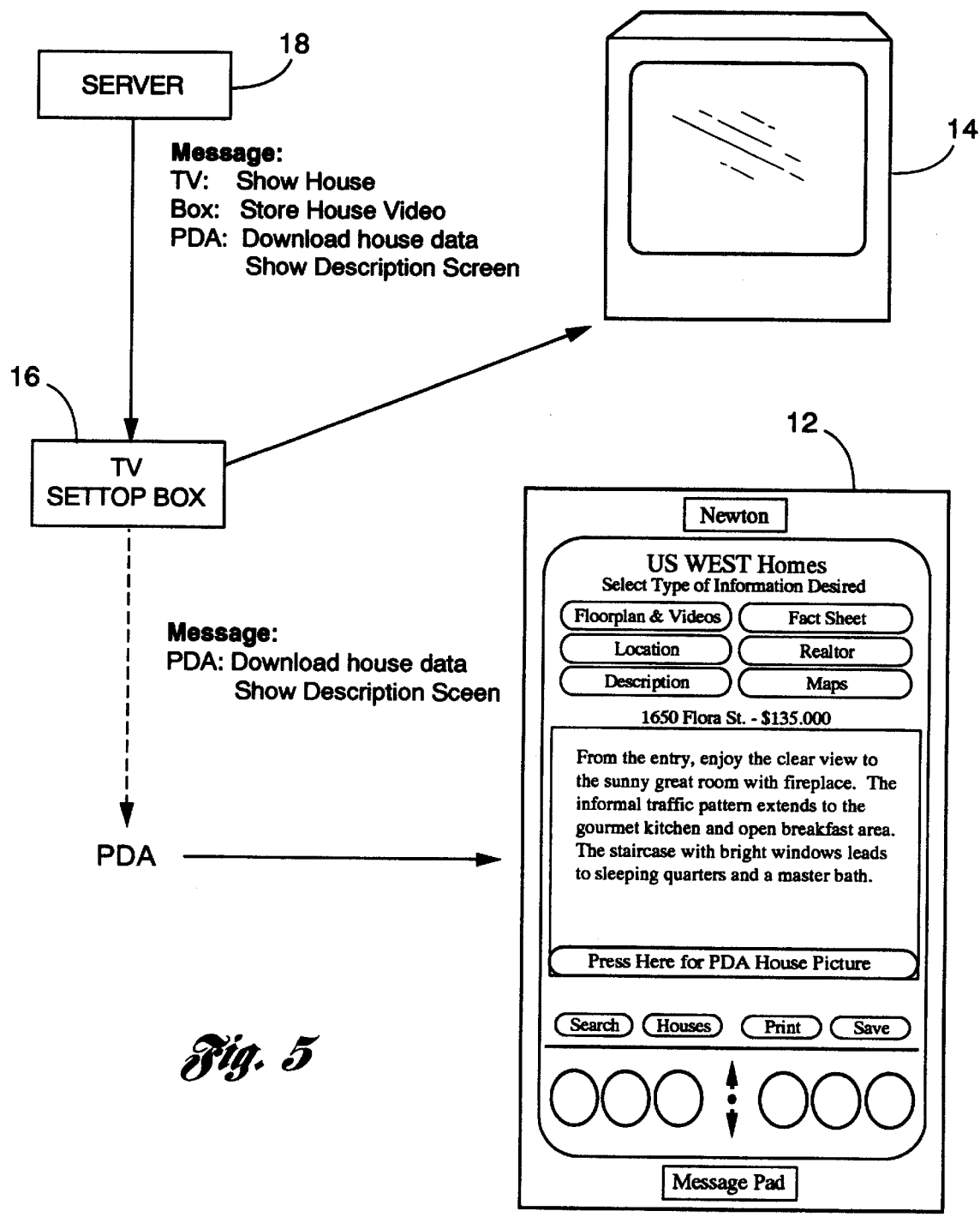
FIG. 5 is a schematic diagram illustrating the sequence and steps performed by the system of the present invention when the central processing unit receives the data signal representing the user input signal.

Upon receiving the signal from the set-top transceiver device 16, the server 18 processes the signal to obtain a synchronization signal. The synchronization signal includes a first display control signal for controlling the display of the PDA 12 and a second display control signal for controlling the display of the TV 14. As shown in FIG. 5, the server sends instructions and new data to the set-top transceiver device 16 for receipt by the PDA 12 and the TV 14. A television, a new picture is displayed on the TV 14. Video data about the home may be downloaded into the set-top transceiver device 16 if there is enough memory. In the case of the PDA 12, data about the specific home is downloaded and the House Information Screen is displayed. Thus, when more information about the home is needed, it is locally available on the PDA 12.

Figure 6:
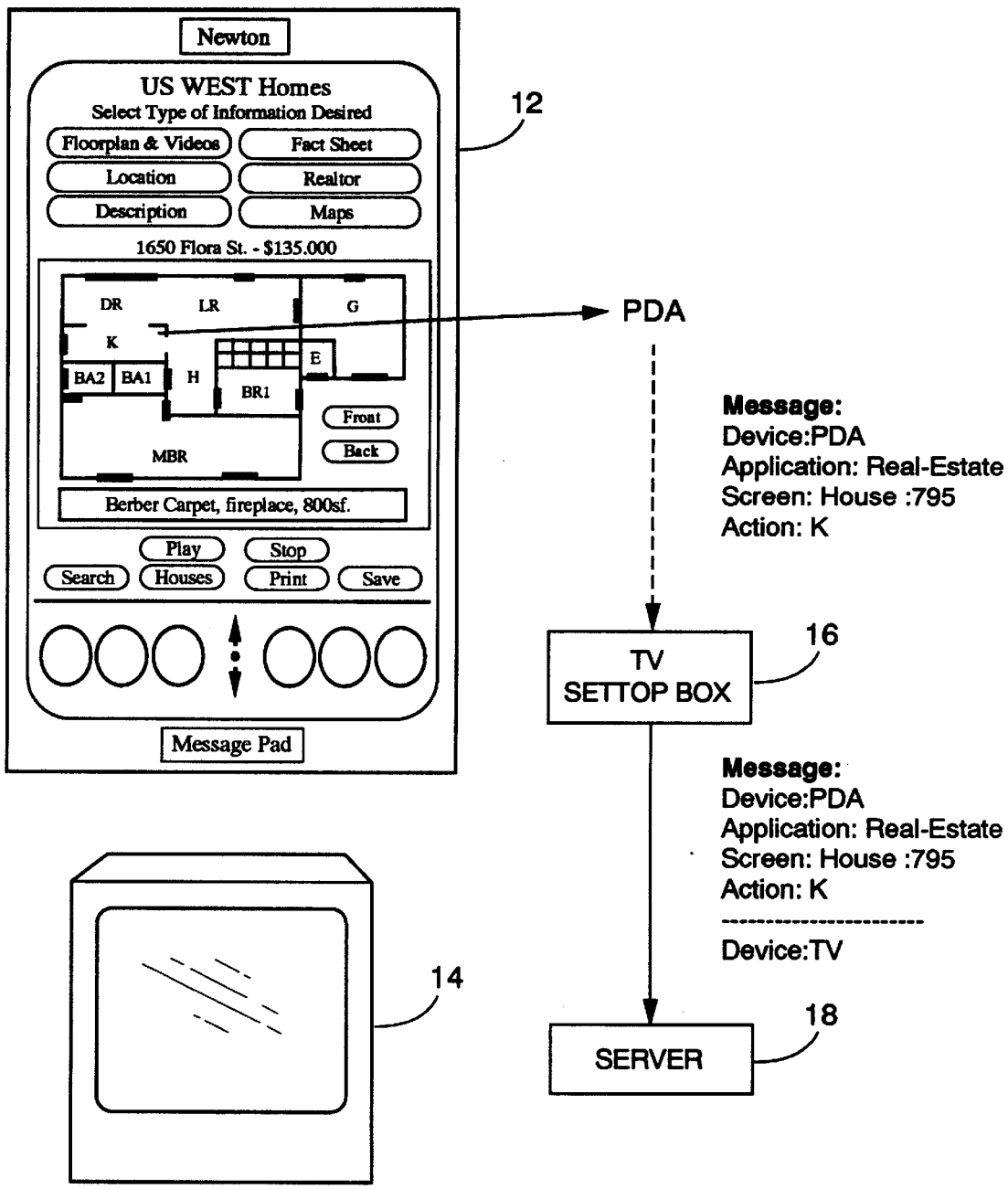
FIG. 6 is a schematic diagram illustrating the sequence of steps performed by the system of the present invention when the mobile interface device receives a second user input signal.
Figure 7:
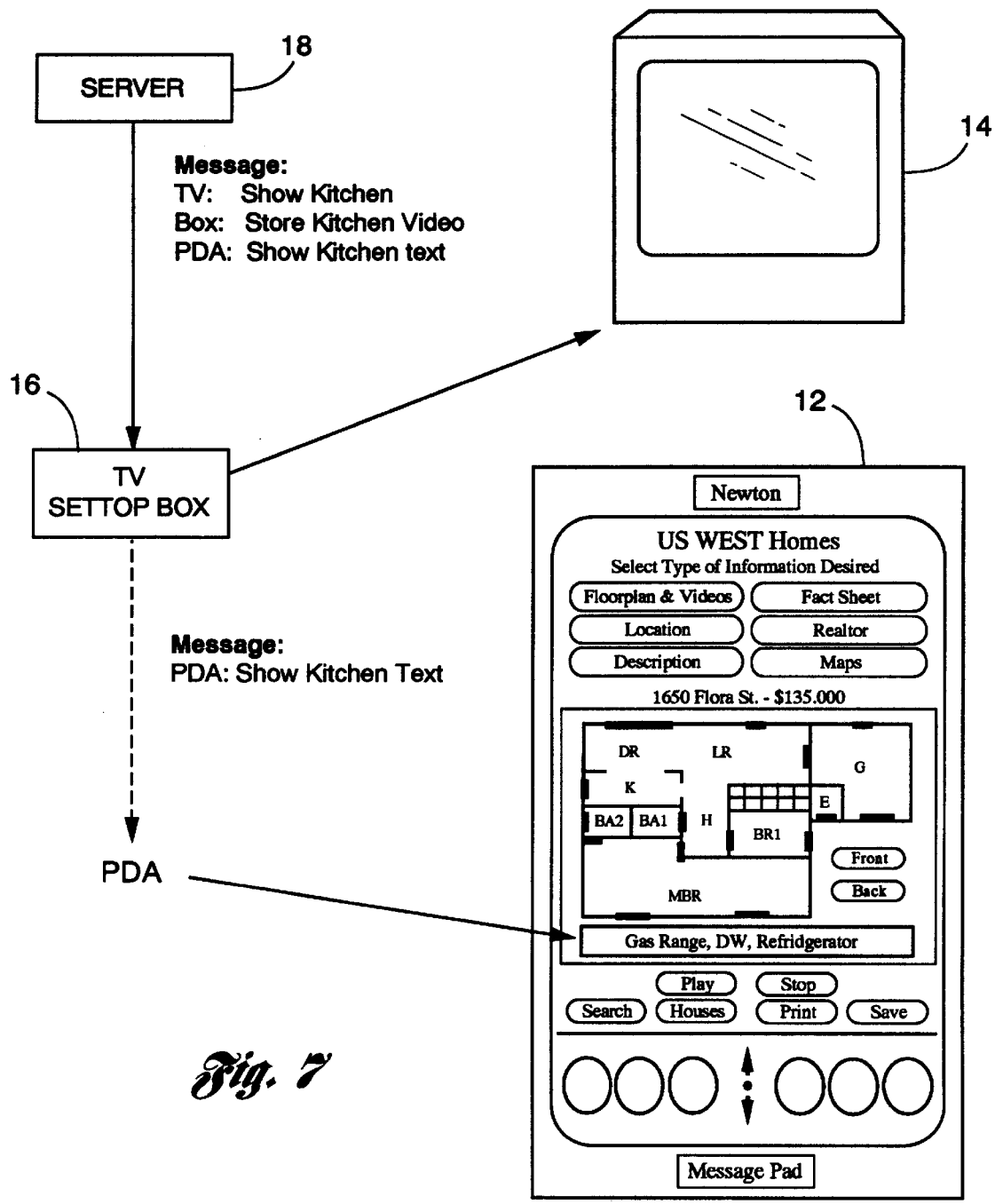
FIG. 7 is a schematic diagram illustrating the sequence of steps performed by the system of the present invention when the central processing unit receives a data signal representing the second user input signal.

FIGS. 6 and 7 illustrate the information processed when a user selects a kitchen, i.e. the "K" button, from the floor plan screen displayed on the PDA 12. Upon selecting the kitchen area, the interactive terminal 14 is instructed to display the kitchen area of the home and the PDA 12 is instructed to display text relating to the kitchen area.

Figure 8:
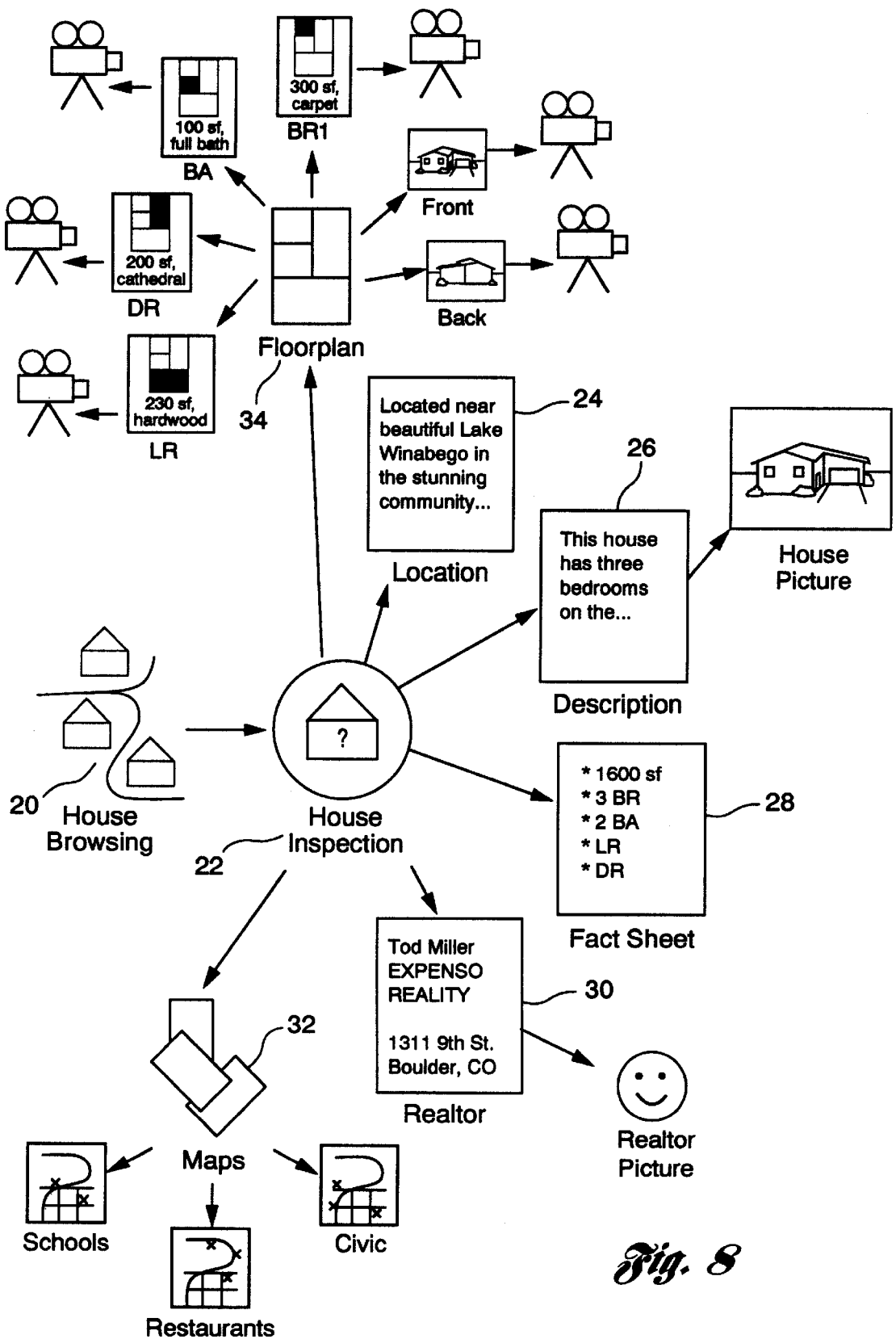
FIG. 8 is a schematic diagram illustrating the organization of the various screen displays available for the mobile interface device in a real estate application.

Turning now to FIG. 8, there is shown the organization of the screens displayed on the PDA 12. After browsing through a plurality of homes, and selecting a specific home for further information, the user is transferred to the House Information Screen, as indicated at 20,22, respectively. At the House Selection Screen, the user may select the "LOCATION" button to obtain information regarding the location of the home, as shown at 24. Alternatively, the user may select the "DESCRIPTION" button to obtain information describing the home, as shown at 26. A picture of the home may be displayed on the TV 14.

Still further, a user may select the "FACT SHEET" button to obtain technical details about the home, as shown at 28.

Information about the realtor may be obtained by selecting the "REALTOR" button from the House Selection Screen, as indicated at 30. If a TV 14 is used, the realtor's picture appears on the display.

The user also has the option of selecting the "MAPS" button to have several map icons displayed on the PDA 12, as indicated at 32. Finally, the user may select the "FLOOR PLANS AND VIDEOS" button to obtain a floor plan of the currently selected home, as shown at 34. In this case, text information is provided on the PDA 12, and if the user is using a TV 14, an image of the room is displayed on the TV 14. A video showing the entire room may also be viewed if a TV 14 is used.

Figure 9:
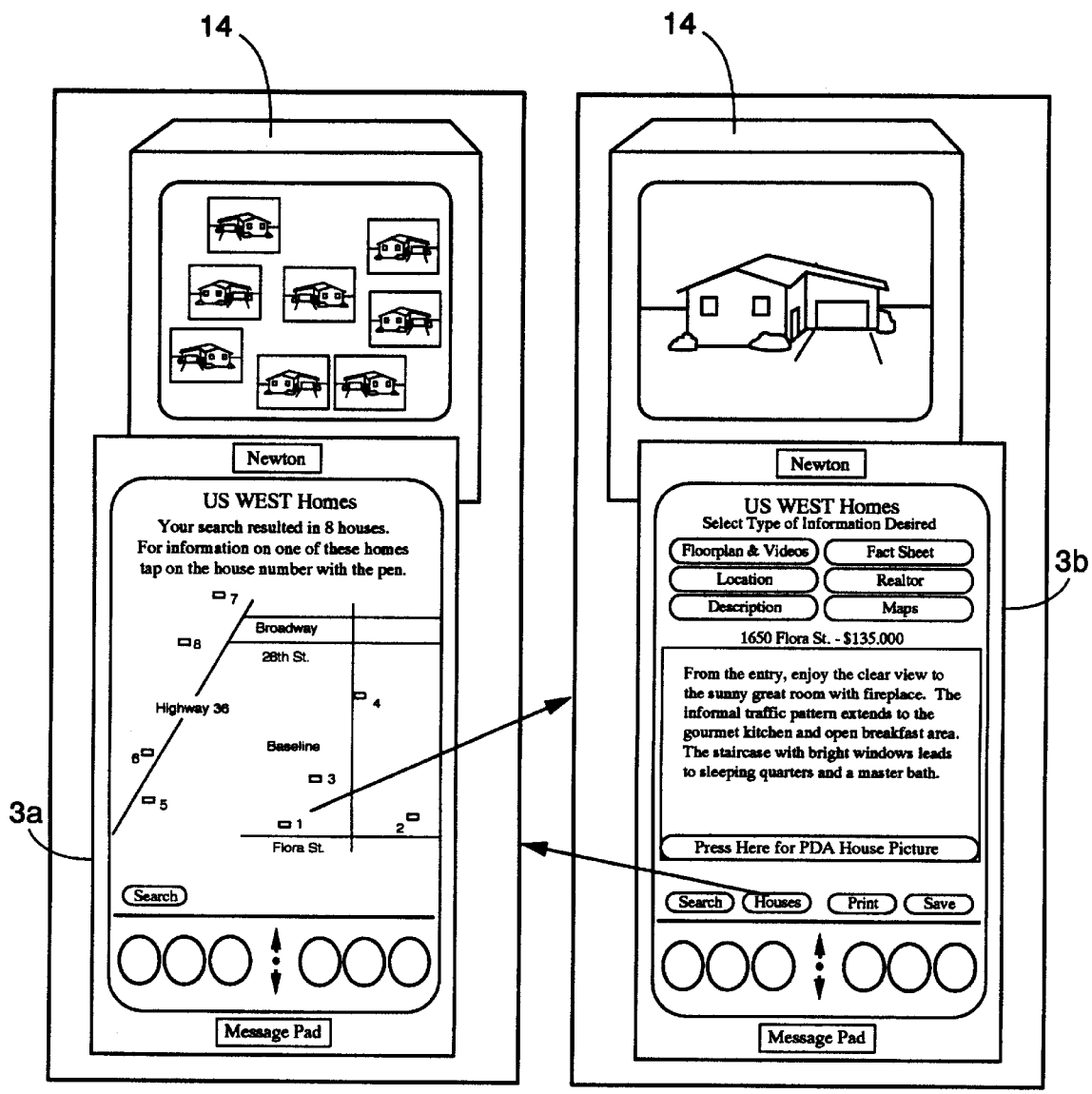
FIG. 9 is a schematic diagram illustrating synchronization of the mobile interface device display and an interactive terminal display.

An example illustrating the synchronization of the displays between the TV 14 and the PDA 12 is shown in FIG. 9. The House Selection Screen 3a on the PDA 12 displays locations on a map while pictures of those homes also appear on the TV 14. Selecting a home on this map using the touch screen results in the display of the House Information Screen 3b on the PDA 12 and a corresponding picture of that house on the TV 14. This example also shows how the PDA 12 can be dynamically reconfigured to offer different options and buttons for controlling both the content of the information on the PDA 12 as well as what is shown on the TV 14.

The PDA-Interactive TV real estate example provides a multi-media information retrieval and browsing application that operates both as a stand-alone device and in conjunction with television images and videos. All control components and text information is placed on the hand-held PDA 12. Information on the TV 14 enhances the ability of users to do the available tasks, but it is not required.

PDA-augmented systems support many different kinds of activities. For example, a user can contact a realtor through the PDA 12 (a communications application), use the PDA 12 to calculate mortgage payments or apply for a loan analysis (financial services applications), or get instructions for how to get to an address from a current location (a transportation application that might even use global positioning data).

While the best modes for carrying out the invention have been described in detail, those familiar with the art to which this invention relates will recognize various alternative designs and embodiments for practicing the invention as defined by the following claims.

What is claimed is:

1. For use with an interactive terminal having a display and a predetermined application associated therewith, a method for synchronizing display of data relating to the predetermined application between the interactive terminal and at least one mobile interface device having a display, the method comprising:

providing each of the at least one mobile interface device with a user input receiving means for receiving a user input signal, the at least one mobile interface device for transmitting the user input signal for synchronization with the interactive terminal;

providing a set-top transceiver device operatively coupled to the interactive terminal and in communication with the at least one mobile interface device for receiving the user input signal from the at least one mobile interface device and for transmitting a synchronization signal to the at least one mobile interface device and the interactive terminal; and providing a remote central processing unit having a database stored therein corresponding to the predetermined application and operatively coupled to the set-top transceiver device for receiving and processing the user input signal based on the database to obtain the synchronization signal for receipt by the set-top transceiver device, the synchronization signal including a first display control signal and a second display control signal, the first display control signal for controlling the display of the at least one mobile interface device and the second display control signal for controlling the display of the interactive terminal so as to allow the at least one mobile interface device to be dynamically reconfigured in response to the user input signal to display data corresponding to the predetermined application associated with the interactive terminal.

2. The method as recited in claim 1 wherein the step of providing the set-top transceiver device includes the step of providing a database and a processor associated therewith and wherein the set-top transceiver device processes the user input signal to obtain the synchronization signal.

3. The method as recited in claim 1 wherein the at least one mobile interface device includes a plurality of mobile interface devices and wherein the step of transmitting the synchronization signal includes the step of broadcasting the synchronization signal to the plurality of mobile interface devices.

4. The method as recited in claim 1 wherein the user input receiving means is a touch screen.

5. The method as recited in claim 4 wherein the touch screen includes virtual buttons adapted to dynamically reconfigure in response to the first display control signal.

6. The method as recited in claim 1 wherein the user input receiving means is a keyboard.

7. The method as recited in claim 1 wherein the user input receiving means is a voice recognizer.

8. The method as recited in claim 1 wherein the mobile interface device is a personal digital assistant.

9. The method as recited in claim 1 wherein the at least one mobile interface device transmits the user input signal using wireless communications.

10. The method as recited in claim 9 wherein the wireless communications is infrared communications.

11. The method as recited in claim 1 wherein the at least one mobile interface device transmits the user input signal using wireline communications.

12. The method as recited in claim 1 wherein the predetermined application is a real estate application.

13. The method as recited in claim 1 wherein the step of providing each of the at least one mobile interface device further includes the step of providing each of the at least one mobile interface device with a memory and a processor for storing and processing the data at the mobile interface device.

14. The method as recited in claim 1 wherein the interactive terminal is a television receiver.

15. The method as recited in claim 1 wherein the interactive terminal is a computer terminal.

16. For use with an interactive terminal having a display and a predetermined application associated therewith, a method for synchronizing display of data relating to the predetermined application between the interactive terminal and at least one mobile interface device having a display, the method comprising:

providing each of the at least one mobile interface device with an input receiving means for receiving a user input signal;

providing a set-top transceiver device operatively coupled to the interactive terminal and in communication with the at least one mobile interface device for transmitting and receiving signals to and from the at least one mobile interface device;

providing a remote central processing unit having a memory containing data corresponding to the predetermined application and operatively coupled to the set-top transceiver device for transmitting and receiving signals to and from the set-top transceiver device;

receiving the user input signal at the at least one mobile interface device;

transmitting the user input signal to the set-top transceiver device to obtain a data signal;

transmitting the data signal to the central processing unit;

processing the data signal based on the database to obtain a synchronization signal having a first display control signal and a second display control signal, the first display control signal for controlling the display of the at least one mobile interface device and the second display control signal for controlling the display of the interactive terminal; and transmitting the synchronization signal to the interactive terminal and the at least one mobile interface device so as to allow the at least one mobile interface device to be dynamically reconfigured in response to the user input signal so as to synchronize display of data between the interactive terminal and the at least one mobile interface device.

17. The method as recited in claim 16 wherein the step of providing the set-top transceiver device further includes the step of providing a memory and a processor associated therewith and wherein the set-top transceiver device processes the user input signal to obtain the synchronization signal.

18. The method as recited in claim 16 wherein the at least one mobile interface device includes a plurality of mobile interface devices and wherein the step of transmitting the synchronization signal includes the step of broadcasting the synchronization signal to the plurality of mobile interface devices.

19. The method as recited claim 16 wherein the input receiving means is a touch screen.

20. The method as recited in claim 19 wherein the touch screen includes a plurality of virtual buttons adapted to dynamically reconfigure in response to the first display control signal.

21. The method as recited in claim 16 wherein the input receiving means is a keyboard.

22. The method as recited in claim 16 wherein the user input receiving means is a voice recognizer.

23. The method as recited in claim 16 wherein the mobile interface device is a personal digital assistant.

24. The method as recited in claim 16 wherein the step of transmitting the user input signal to the set-top transceiver device is performed using wireless communications.

25. The method as recited in claim 24 wherein the wireless communications is infrared communications.

26. The method as recited in claim 16 wherein the step of transmitting the user input signal to the set-top transceiver device is performed using wireline communications.

27. The method as recited in claim 16 wherein the predetermined application is a real estate application.

28. The method as recited in claim 16 wherein the step of providing the at least one mobile interface device further includes the step of providing each of the at least one mobile interface devices with a memory and a processor for storing and processing the data at the at least one mobile interface device.

29. The method as recited in claim 16 wherein the interactive terminal is a television receiver.

30. The method as recited in claim 16 wherein the interactive terminal is a computer terminal.

31. For use with an interactive terminal having a display and a predetermined application associated therewith, a system for synchronizing display of data relating to the predetermined application between the interactive terminal and at least one mobile interface device having a display, the system comprising:

the at least one mobile interface device further including a user input receiving means for receiving a user input signal, the at least one mobile interface device for transmitting the user input signal for synchronization with the interactive terminal;

a set-top transceiver device operatively coupled to the interactive terminal and in communication with the at least one mobile interface device for receiving the user input signal from the at least one mobile interface device and for transmitting a synchronization signal to the at least one mobile interface device and the interactive terminal; and a remote central processing unit having a database stored therein corresponding to the predetermined application and operatively coupled to the set-top transceiver device for receiving and processing the user input signal based on the database to obtain the synchronization signal for receipt by the set-top transceiver device, the synchronization signal including a first display control signal and a second display control signal, the first display control signal for controlling the display of the at least one mobile interface device and the second display control signal for controlling the display of the interactive terminal so as to allow the at least one mobile interface device to be dynamically reconfigured in response to the user input signal so as to synchronize display of data between the interactive terminal and the at least one mobile interface device.

32. The system as recited in claim 31 wherein the set-top transceiver device includes a database and a processor associated therewith and wherein the set-top transceiver device processes the user input signal to obtain the synchronization signal.

33. The system as recited in claim 31 wherein the at least one mobile interface device includes a plurality of mobile interface devices and wherein the set-top transceiver device is further provided for broadcasting the synchronization signal to the plurality of mobile interface devices.

34. The system as recited in claim 31 wherein the user input receiving means is a touch screen.

35. The system as recited in claim 34 wherein the touch screen includes virtual buttons adapted to dynamically reconfigure in response to the first display control signal.

36. The system as recited in claim 31 wherein the user input receiving means is a keyboard.

37. The system as recited in claim 31 wherein the user input receiving means is a voice recognizer.

38. The system as recited in claim 31 wherein the at least one mobile interface device is a personal digital assistant.

39. The system as recited in claim 31 wherein the at least one mobile interface device transmits the user input signal using wireless communications.

40. The system as recited in claim 39 wherein the wireless communications is infrared communications.

41. The system as recited in claim 31 wherein the at least one mobile interface device transmits the user input signal using wireline communications.

42. The system as recited in claim 31 wherein the predetermined application is a real estate application.

43. The system as recited in claim 31 wherein the at least one mobile interface device further includes a memory and a processor for storing and processing the data at the at least one mobile interface device.

44. The system as recited in claim 31 wherein the interactive terminal is a television receiver.

45. The system as recited in claim 31 wherein the interactive terminal is a computer terminal.

* * * * *